United States Patent [19]
Gülich et al.

[11] 3,919,687
[45] Nov. 11, 1975

[54] GUIDING SYSTEM FOR LANDING AIRCRAFTS

[75] Inventors: Tore Gülich, Malmo, Schweden; Lennaet Stigmark, Staffanstorp, Schweden, both of Sweden

[73] Assignee: Aktiebolaget Electrolux, Stockholm, Sweden

[22] Filed: Apr. 18, 1974

[21] Appl. No.: 461,925

[52] U.S. Cl............................ 340/27 NA; 73/178 T
[51] Int. Cl.² .......................................... G08G 5/00
[58] Field of Search .. 340/26, 27 R, 27 NA, 27 AT, 340/38 L

[56] References Cited
UNITED STATES PATENTS

| | | | |
|---|---|---|---|
| 2,224,863 | 12/1940 | Dingley | 177/352 |
| 2,226,930 | 12/1940 | Hefele | 250/11 |
| 3,160,369 | 12/1964 | Edmison | 244/77 |
| 3,355,733 | 11/1967 | Mitchell et al. | 343/7.9 |
| 3,624,598 | 11/1971 | Foster | 340/26 |
| 3,662,977 | 5/1972 | Shannon | 244/114 R |

Primary Examiner—Thomas B. Habecker
Assistant Examiner—James J. Groody
Attorney, Agent, or Firm—Walter Becker

[57] ABSTRACT

A guiding system for an aircraft during its landing approach to touchdown, according to which there is provided on the ground below the glide path an electrical conductor supplied with constant frequency current pulses for generating a magnetic field extending to the altitude of the glide path. The aircraft contains a coil arrangement consisting of three relatively perpendicular coils in which the magnetic field induces voltages, and also contains a measuring instrument comprising a first coil to which are applied the differences between the voltages induced in the coils responding to the horizontal component of the magnetic field and a second coil to which is applied the voltage induced in the coil responding to the vertical component of the magnetic field.

4 Claims, 8 Drawing Figures

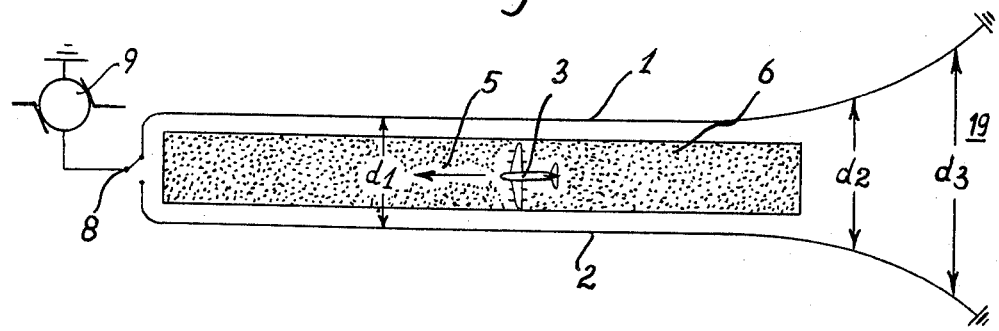
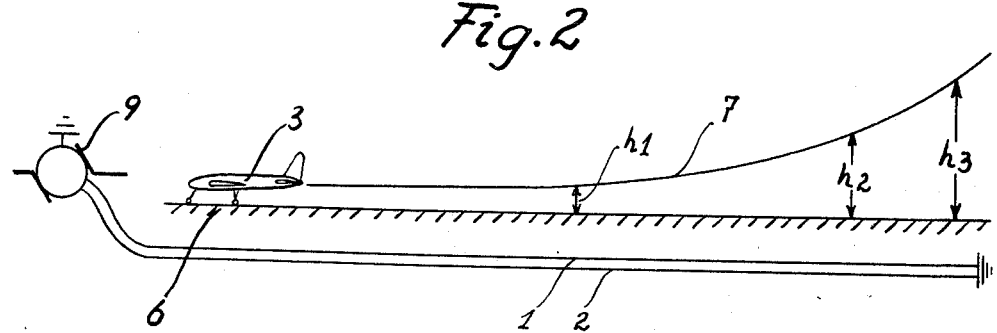
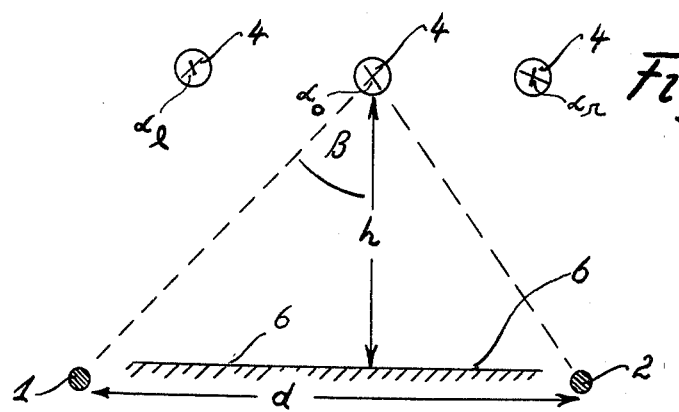

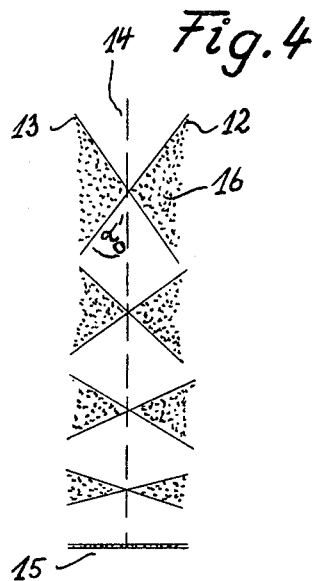
Fig. 4
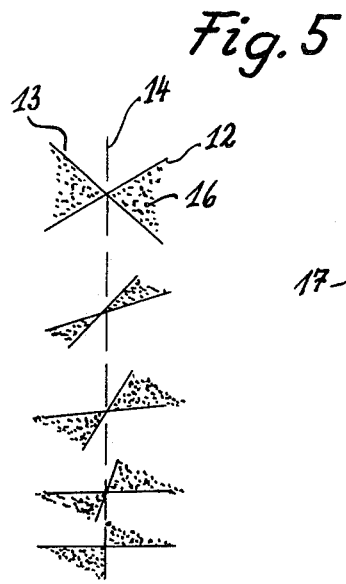
Fig. 5
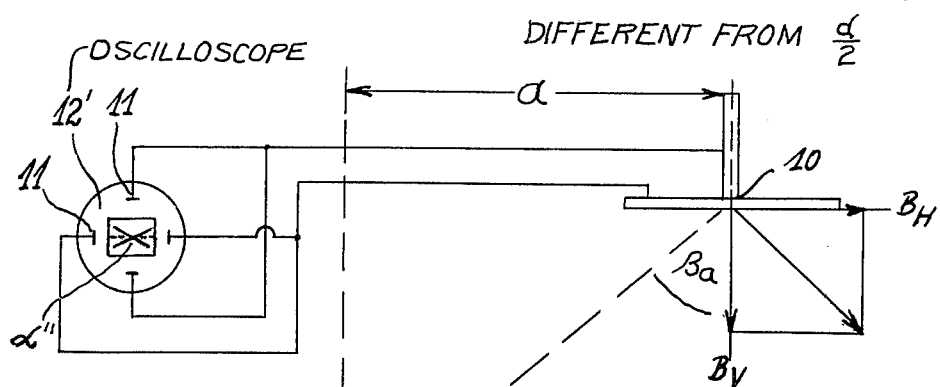
Fig. 6
Fig. 7
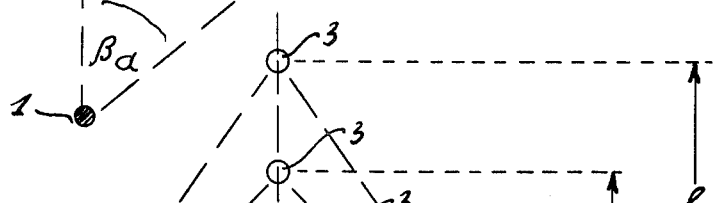
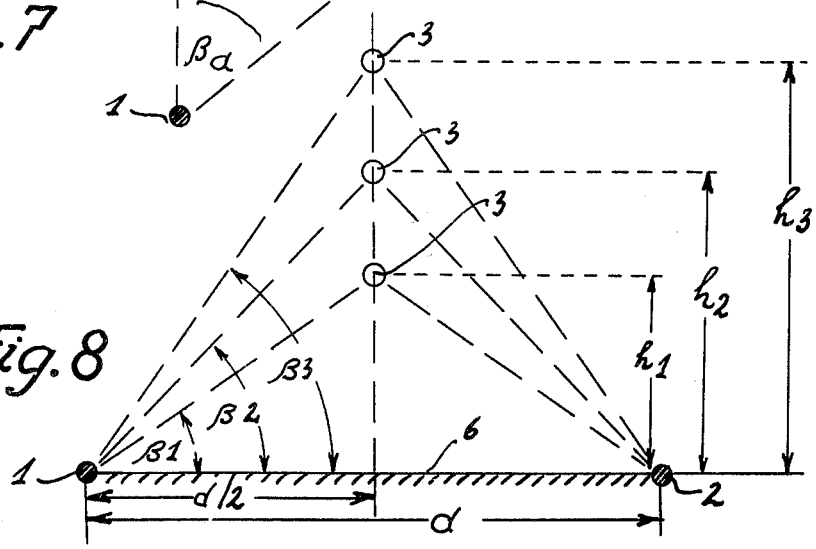
Fig. 8

GUIDING SYSTEM FOR LANDING AIRCRAFTS

The invention relates to a landing approach guidance system for aircraft.

It is the general practice to afford guidance to aircraft approaching the runway by radar instruments whenever a visual landing approach is impossible. Radar equipment is very expensive and calls for considerable skill and ability on the part of the pilot reading the radar display. It has also been proposed to make use of laser beams to assist pilots when landing.

All these systems necessitate the provision of complicated and expensive instrumentation. Moreover, pilots must be continuously trained in the operation and use of known and freshly developed systems.

It is an object of the present invention to provide a system which will make the guided approach when landing much simpler and reduce the cost of the equipment, and which can be installed at airports and in aircraft without considerable difficulties.

These and other objects and advantages of the invention will appear more clearly from the following specification, in connection with the accompanying drawings, in which:

FIG. 1 is a plan of a landing lane and of the electrical conductors laid along the sides of the path.

FIG. 2 is a longitudinal section of a landing lane taken on the line of one of the conductors. FIG. 3 is a cross section of a landing lane indicating the location of the instruments in the aircraft.

FIG. 4 shows different displays of a measuring instrument in an aircraft in the prescribed path of approach.

FIG. 5 shows different displays of a measuring instrument in an aircraft deviating from the prescribed path of approach.

FIG. 6 shows different indications of a dial type instrument.

FIG. 7 is the circuit diagram of an oscilloscope.

FIG. 8 is a diagram of aircraft at different altitudes above the landing lane.

According to the present invention there is provided a system for guiding an aircraft during its approach to touchdown, wherein there are provided on the ground below the glide path two spaced electrical conductors supplied with constant frequency current pulses for generating magnetic fields which extend to the altitude of the glide path, and in the aircraft a coil arrangement consisting of two coils arranged perpendicularly with regard to each other, in which the magnetic fields induce voltages, and a measuring instrument containing a first coil to which is applied the voltage induced in the coil responding to the horizontal component of the magnetic field and a second coil to which is applied the voltage induced in the coil responding to the vertical component of the magnetic field.

In a preferred embodiment of the invention the measuring instrument is an oscilloscope containing two pairs of deflecting plates which give an asymmetric trace in relation to the null position in the symmetry axis when the aircraft laterally deviates from its prescribed glide path and the size of the asymmetric trace being a measure of the momentary altitude of the aircraft.

Preferably, equipment according to the invention includes two relatively thin wires which can be easily laid in the ground along the path of approach. Moreover, in the aircraft relatively simple measuring instruments and coils which are capable of being produced on a large scale can be installed.

Referring now to the drawings in detail, the system according to the invention substantially comprises two electrical conductors 1, 2 and a measuring instrument 4 (FIG. 3) installed in an aircraft 3. The two electrical conductors 1, 2 extend in the direction of approach 5 of the aircraft 3 on each side of a runway 6. The aircraft 3 itself descends on a glide path 7 to touchdown on the runway 6.

The two conductors 1, 2 are connected at one end by a pulsing switch 8 to a generator 9 which is grounded, as are the ends of conductors 1, 2.

Installed on board the aircraft 3 is a coil arrangement 10 in which the magnetic fields of the two conductors 1, 2 induce voltages. In order to determine the coordinates of the position of the aircraft in space the coil arrangement consists of three coils of which one responds to the horizontal component and one to the vertical component of the magnetic field. The two coils are therefore perpendicular with respect to each other and they are connected to a measuring instrument preferably comprising an oscilloscope 12' with deflecting plates 11. If the flight path of the aircraft 3 is laterally offset a horizontal distance $a$ away from one of the conductors, i.e. conductor 1, then this distance $a$ will correspond to an angle $\beta_a$. This angle will appear on the oscilloscope screen between a vertical center line and a deflected trace corresponding to the induced voltage caused by the magnetic field from conductor 1.

The oscilloscope displays segments 16 between crossed lines 12 and 13 on the display screen. The greater the strength of the magnetic field and the higher the voltage induced in the coils 10, the more will the crossed lines 12, 13 swing away from the vertical 14 towards the horizontal 15. When they are in the horizontal position 15 the aircraft 3 will be just about to touch down on the runway 6 (FIG. 2). The magnitude of the horizontal segments 16 between the crossed lines 12 and 13, therefore, represents the altitude $h$ of the aircraft 3 above the runway 6.

Moreover, the angles the crossed lines 12 and 13 form with the vertical 14 indicate if and how far the aircraft 3 has deviated to one side or the other from the prescribed glide path. If the aircraft is exactly above the center line between the two conductors 1, 2 the angles $\alpha'_o$ of the two crossed lines 12 and 13 to the horizontal 15 will be the same. In other words, the two horizontal segments 16 will be symmetrical with reference to the vertical 14.

However, as soon as the aircraft 3 ceases to be above this center line between the two conductors 1 and 2, the effect of that magnetic field towards which the aircraft 3 has deviated from the prescribed glide path 7 will preponderate. Consequently the segments 16 defined by the crossed lines 12 and 13 will also cease to be symmetrical with respect to the vertical 14 and the aircraft 3 must therefore be pulled back into a glide path in which the two segments 16 are again symmetrical with reference to the vertical.

The measurement of the direction of flight of the aircraft over the ground can be effected by a dial type instrument 17. This will be an instrument containing two coils of which each is connected to the coil system 10. The two coils in the instrument 17 are so connected that in zero position the pointer points vertically upwards. This will be the case when the direction of flight of the aircraft 3 agrees with its prescribed glide path. If there is a deviation from this direction due to drift to the left or the right the pointer 18 of the instrument will be deflected to one side or the other. The direction of flight of the aircraft 3 over the ground can then be suitably corrected to restore the pointer 18 to its center position vertically upwards (null indicator).

The voltage supplied by the generator 9 is first applied to one of the two conductors, e.g., to conductor 1. The pulsing switch 8 is then activated to connect each conductor 1 and 2 in turn to the generator 9 at a given rate. The frequency of the pulsing switch may be so chosen that it exceeds the inertia of the measuring instrument 4. The measuring instrument 4 will then give a steady reading. This reading will change only when the influence of each of the two magnetic fields on the instrument 4 changes the aircraft flying at a lower or higher altitude above the conductors. If the instrument is an oscilloscope the pulsing frequency used will be one exceeding the rate of response of the human eye. Consequently apparently only two straight lines will appear on the screen which indicate the direction of the two conductors 1 and 2. If the display is symmetrical, the aircraft 3 is precisely above the center of the landing lane. FIG. 8 shows that the angle between the two lines is a measure indicating altitude. In the equation $$\frac{B}{2} \cdot \tan\beta = h$$

$B$ is the width of the runway or the distance between the two conductors 1 and 2.

Consequently the glide path of the aircraft can be determined from its direction of flight over the ground and its altitude.

When approaching the runway 6, the aircraft is first above an approach lane 19 in which the coil arrangement 10 first picks up the magnetic field of the two conductors 1 and 2. For improving the guidance given to the pilot into the direction of the runway 6, the ends of the conductors 1 and 2 separate in a wide arc on each side of the ground approach lane. This facilitates picking up the magnetic fields marking the entrance to the runway 6.

By a particular configuration of the flared approach lane on the ground, the altitude of the approaching aircraft is also determined. Since the altitude of the point of intersection of equiangular lines from the ends of a line transversely connecting the outwardly arching conductors increases as the conductors separate further, the pilot can keep this angle constant during approach and his aircraft will then lose altitude as the distance $d$ between the conductors increases, roughly in accordance with the proportion $$\frac{h_1}{h_2} = \frac{d_1}{d_2}$$

A desired glide path can be predetermined by suitably selecting an angle of elevation and the divergence of the funnel-shaped entry.

The aircraft 3 is now steered by the pilot to keep it on the glide path 7 which lies exactly above the middle between the two conductors 1, 2. As soon as the measuring instrument 4 indicates a deviation towards on side, the direction of flight of the aircraft can be corrected accordingly. When the effect of the magnetic fields on the measuring instrument 4 reaches its peak the aircraft 3 is about to touch down. At this instant the measuring instrument 4 should indicate that the aircraft 3 is precisely in the middle between the two conductors 1, 2.

The reading can also be taken from the display on the oscilloscope. A deviation from the glide path 7 will be reflected in the display because the lines on the oscilloscope screen will be of unequal length. The direction of flight must therefore be corrected in order to restore the two lines generated by the magnetic fields to equal length.

The direction of flight of the aircraft can also be determined by only one cable. The magnetic field surrounding such a cable is sufficient to induce voltages in a three-coil system adapted to measure the coordinates of a position in space and to cause deflections in associated instruments which by their magnitude indicate the position of the aircraft in space in relation to such a cable. This should preferably be laid in the center line of a runway. Preferably the cable will be extended beyond the end of the runway into the approach lane on the ground.

It is, of course, to be understood that the present invention is, by no means, limited to the specific showing in the drawings, but also includes any modifications within the scope of the appended claims.

What we claim is:

1. In combination with an aircraft for aiding the latter during its landing approach to touch down: electric conductor means arranged in the ground at both sides along the glide path of the landing aircraft, the ends of the conductor means which are intended to be entered first by the landing aircraft converging towards the point of touch down, constant frequency current means operable to convey current to said electric conductor means, a switch alternately connecting the one and the other of the electric conductor means to said current means, the currents in the conductor means generating magnetic fields extending to the altitude of said glide path, a coil system provided in said aircraft, the coil system comprising first coil means for picking up the horizontal component of said magnetic fields and second coil means for picking up the vertical component of said magnetic fields, said coil means being arranged substantially perpendicular with regard to each other and being adapted to have voltages induced therein by said magnetic fields, and indicating means in said aircraft and said indicating means being electrically connected to the coil system to receive the voltages induced, the indicating means giving a presentation of the voltages caused by the magnetic fields of one and the other of the two conductor means, the presentation, when being symmetric with respect to a reference indication indicating that the aircraft flies halfway between the two conductors.

2. The combination according to claim 1, in which said indicating means includes an oscilloscope having two pairs of deflecting plates, one pair of plates being electrically connected to the first coil means and the other pair of which being electrically connected to the second coil means, the oscilloscope producing a display which has the form of two horizontal segments of which the angular size indicates altitude, whereas their symmetry with respect to a vertical reference line is a measure of the lateral deviation of the aircraft from its prescribed glide path.

3. The combination according to claim 1, in which the two conductor means converge in such a way that in any point along the glide path the distance between the two conductor means is proportional to the altitude of the glide path.

4. The combination according to claim 1, in which the two conductor means converge in such a way that in any point along the glide path the distance between the two conductor means is proportional to the altitude of the glide path, whereby in any point along the glide path the altitude of the glide path corresponds to the same constant angular size of the two horizontal segments.

* * * * *